(No Model.)
E. WESTON.
DYNAMO OR MAGNETO ELECTRIC MACHINE.
No. 289,200. Patented Nov. 27, 1883.
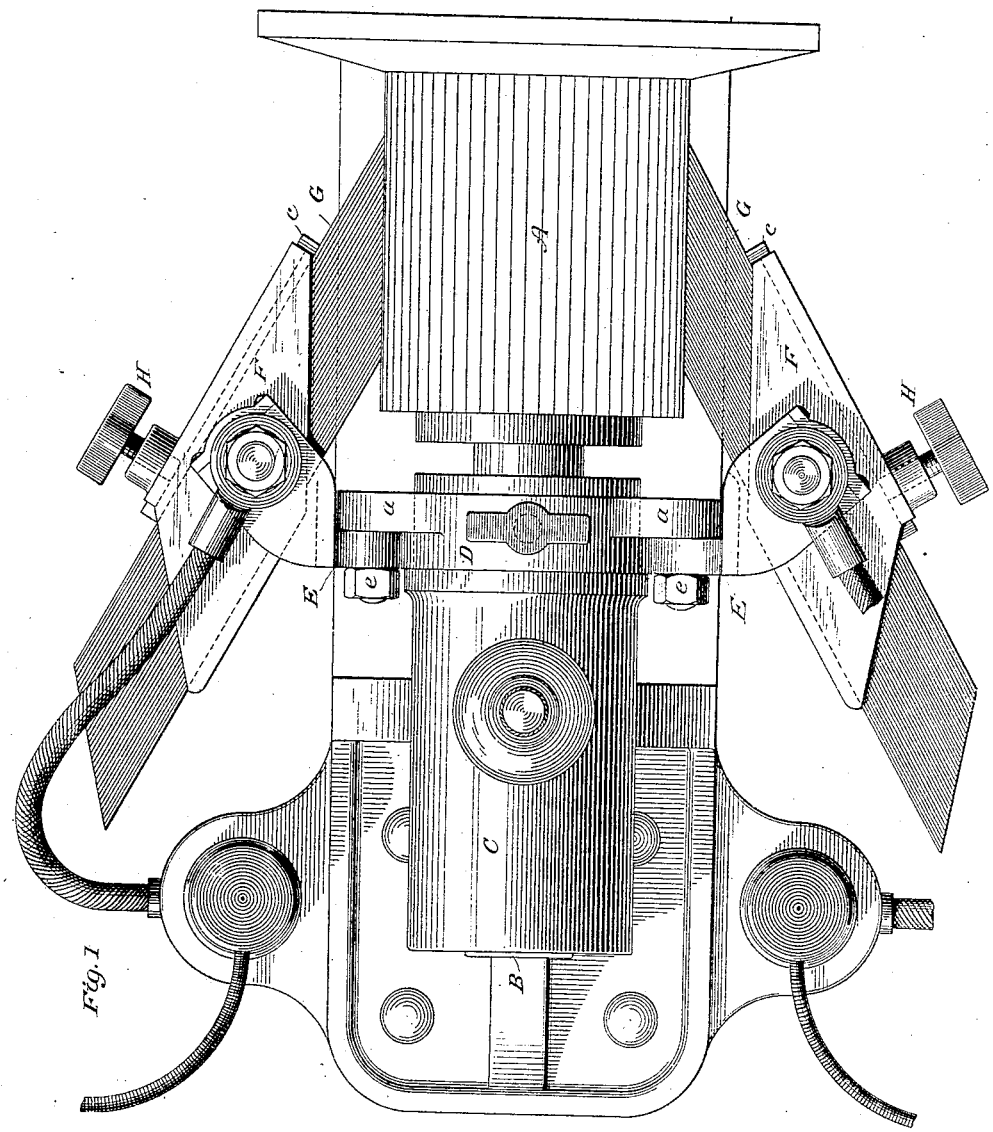

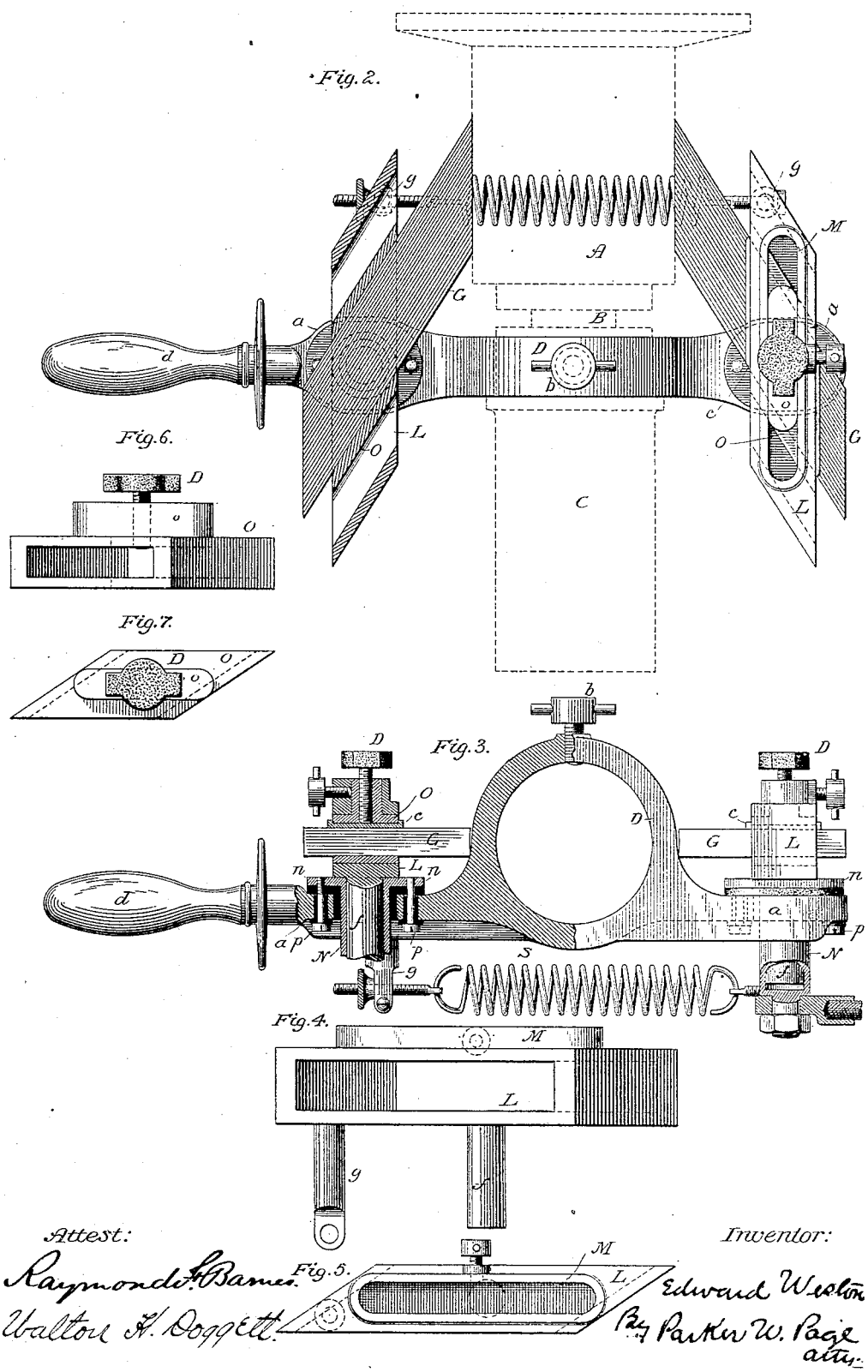

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

DYNAMO OR MAGNETO ELECTRIC MACHINE.

SPECIFICATION forming part of Letters Patent No. 289,200, dated November 27, 1883.

Application filed July 2, 1883. (No model.)

*To all whom it may concern:*

Be it known that I, EDWARD WESTON, a subject of the Queen of Great Britain, and a resident of Newark, in the county of Essex and State of New Jersey, have invented certain new and useful Improvements in Dynamo or Magneto Machines, of which the following is a specification, reference being had to the drawings accompanying and forming a part of the same.

In dynamo or magneto machines and motors the commutator springs or brushes have always been arranged tangentially to the cylinder carrying the contact or terminal plates, or, in other words, they have been held by the brush-holders at right angles, or practically so, to the radii of the commutator, and so that a portion of the side is presented as the bearing-surface. The tendency of wear under such an arrangement is to bevel the ends of the brushes, so that the points or lines of contact are continually changing position with reference to the maximum points of the commutator. In all cases when the brushes are applied in the usual manner the wearing away during the operation of the machine of the ends of the brushes, which causes their lines of contact to recede from the maximum points, occasions a loss of energy and injury to the commutator from the occurrence of sparks. No effective means of overcoming this has heretofore been known, except by constantly adjusting the brushes.

The object of my present invention is mainly to obviate the necessity of adjusting the brushes so as to keep them on the proper points, and to produce a bearing or collecting brush requiring little attention and manipulation, and which will, without change in position or adjustment, permit the machine or commutator to run in either direction. For this purpose I so construct and apply the commutator-brushes that the change of position of the points of contact of the same with the commutator, due to wear, shall be along the line of the maximum points instead of away from them, and to this end I combine with a cylindrical commutator of any ordinary kind bearing-springs, brushes, or plates, and means for holding the same in the same plane, and with their edges against the commutator, and I have also devised, and employ in connection with such means, certain other instrumentalities for holding the brushes at an angle to the axis of the commutator, for adjusting and for facilitating the withdrawal of the brushes, and for keeping them in proper relation to the commutator.

I have illustrated a convenient and practicable means of carrying out my invention in the drawings hereto annexed, in which—

Figure 1 is a plan or top view of a part of a machine and a commutator with brushes made and applied thereto in accordance with my invention. Fig. 2 is a plan and part sectional view of slightly-modified brush-holders and brushes. Fig. 3 is a side elevation and part section of the parts shown in Fig. 2. Fig. 4 is a side view of an outer casing forming part of the brush-holder. Fig. 5 is a top view of the same; Fig. 6, a side view of the brush-holding device, and Fig. 7 a top view of the same.

Referring to Fig. 1 for a description of the general plan and purpose of the invention, A designates a commutator; B, the main shaft of the machine, the field-magnets and armature not being shown; and C, the bearing for the shaft. Around the bearing on the shaft is a collar, D, having two projecting lugs or ears, *a a*, to which are clamped the brush-holding devices, as in other types of machine illustrated in numerous patents granted to me.

E E are arms, secured by bolts *e* to the ears *a*.

F F are boxes pivoted to the arms E E, and G are the commutator-brushes extending through the boxes F, and secured therein by plates *c* and screws H, that pass through the sides of the boxes and impinge upon the plates *c*. The brushes G may be made in any way desired. They may be simple plates of copper, or be composed of a number of superposed narrow strips of metal, or of a bundle of wires. I prefer, however, to make them of a number of superposed flat narrow copper strips of equal length, either silvered or not, and bundled together loose or secured together at their outer ends. It is desirable to shape or assemble them so that as a brush they will have the shape of a parallelogram, with their ends in close contact with the commutator-cylinder.

The boxes or holders F are pivoted to the arms E, and are adjustable or movable, so that the ends of the brushes may be moved away from the commutator when so desired. In order to maintain good contact between the brushes and the commutator, it is desirable to apply in some way a spring to keep an even pressure between the two, and this spring may be applied to the pivoted boxes F in a variety of ways. The form of brush-holder best adapted to practical use is shown in Figs. 2 and 3, where A represents the commutator, B the shaft, and C the bearing.

D is the collar surrounding the bearing, and provided with ears $a\ a$, binding-screw $b$, and a handle, $d$.

L L are boxes or frames, each having a slot, M, in one side, and two pins or posts, $f\ g$, projecting from the other.

Metal cylinders N, with wide flanges $n$ at one end, pass through and are secured to the ears $a\ a$. Through these pass the pins $f$ of the boxes L, and by these means the latter are held in place.

O O are boxes of similar shape to the boxes L, but of smaller dimensions. Upon the side of each are guides $o$, that pass through the guides M. Through the guides $o$ pass screws D, with insulating-heads, and through flanges $m$ around the slots M pass screws $p$. The brushes G are passed through the boxes O. After these latter have been placed in position in the larger boxes L L, plates $c$ are inserted between the brushes and the screws P, and the screws tightened to clamp the brushes in firmly. The proper adjustment of the brushes is then obtained by sliding the boxes O along in the boxes L until the brushes are brought to the desired points upon the commutator, and then tightening the screws $p$. The brushes are brought into the proper place by turning the collar D by means of the handle $d$, and then tightening the screw $b$.

In order that the brushes may be kept in close contact with the commutator, I employ an adjustable spiral spring, S, the opposite ends of which are connected to the posts or pins $g$, though insulated from one or both of the same. The line or circuit connections are made to the ends of the cylinders N, binding-posts or other means being placed at those points for making the necessary connections. The cylinders N and the bolts or screws by which they are held in place are surrounded by collars of insulating material, so that the circuit to line is made from the cylinders to the pins $f$, to the boxes L and O, and the brushes contained therein.

Brushes made and applied in the way I have described I have found to be subject to but little wear, so that the shifting of the brushes to compensate for wear is very seldom required. As the brushes are forced toward the commutator in the same plane, the lines of contact do not change position with respect to the maximum points. Another important feature is the fact that with brushes thus arranged the commutator and armature may be turned in either direction without injury to itself or the brushes. In properly-constructed machines or motors, in which the maximum points of the commutator lie in a fixed position at right angles to the polar line, or a line passing through the center of the pole-pieces, this becomes a highly important feature, as it permits such machines or motors to be reversed at will without adjustment of the brushes.

Though describing my invention by reference to specific means for practicing or applying the same, I do not confine myself to such means, as any others for accomplishing a similar result may be used.

Reserving the right to make subject of other applications features of novelty herein shown or described but not claimed, what I now claim as my invention is—

1. The combination, with the commutator of a dynamo or magneto electric machine or motor, of brushes, plates, or springs, and means for holding the same in the same plane with the axis of the commutator, and with their edges in contact with the commutator, as and for the purpose specified.

2. The combination, with the commutator of a dynamo or magneto electric machine or motor, of brushes, plates, or springs, and means for holding the same at an angle to the axis of the commutator and in the same plane with the axis.

3. The combination, with the commutator of a dynamo or magneto electric machine or motor, of brushes, plates, or springs movable or adjustable with reference to said commutator in the same plane with its axis, as and for the purpose set forth.

4. The combination, with the commutator of a dynamo or magneto electric machine or motor, of brushes, plates, or springs, and pivoted or swinging holders for holding said brushes in the same plane with the axis of the commutator and presenting their edges to the commutator, as described.

5. The combination, with a commutator, of brushes, plates, or springs, means for holding them in the same plane with the axis of the commutator, with their edges in contact with the commutator, and springs for maintaining such contact, substantially as and for the purpose set forth.

6. The combination, with a cylindrical commutator, of brushes, plates, or springs, and holders capable of adjustment in a direction parallel with the axis of the commutator, and constructed to maintain the brushes in the same plane and with their edges presented to the commutator.

7. The combination, with a cylindrical commutator, of brushes, plates, or springs, and pivoted or swinging holders capable of adjustment in a direction parallel with the axis of the commutator, and constructed to maintain the brushes in the same plane, with their edges presented to the commutator.

8. The combination, with a cylindrical commutator, of brushes, plates, or springs, pivoted boxes or frames, and means for securing said brushes within the same, the boxes or frames being constructed in substantially the manner described, for holding the brushes in the same plane and presenting their edges to the commutator.

9. The combination, with a cylindrical commutator, of brushes, plates, or springs, pivoted boxes or frames, and brush-holders adjustable within said boxes or frames and constructed to hold the brushes in the same plane, with their edges presented to the commutator.

10. The combination, with a cylindrical commutator, of brushes, plates, or springs, pivoted boxes or frames, brush-holders contained therein, and a spring connected to the two boxes or frames for holding the brushes in contact with the commutator, as described.

11. The combination, with a cylindrical commutator, of brushes or plates, pivoted boxes or frames L L, boxes O O, adjustable therein, and spring S, substantially as described.

In testimony whereof I have hereunto set my hand this 29th day of June, 1883.

EDWARD WESTON.

Witnesses:
H. A. BECKMEYER,
L. V. E. INNES.